(12) United States Patent
Carroll

(10) Patent No.: US 6,338,274 B1
(45) Date of Patent: Jan. 15, 2002

(54) TUNED FLEXURE ACCELEROMETER

(75) Inventor: Raymond Carroll, Boxford, MA (US)

(73) Assignee: Milli Sensor Systems & Actuators, Inc., West Newton, MA (US)

( * ) Notice: Subject to any disclaimer, the term of this patent is extended or adjusted under 35 U.S.C. 154(b) by 0 days.

(21) Appl. No.: 09/316,723

(22) Filed: May 21, 1999

(51) Int. Cl.$^7$ .............................................. G01P 15/125

(52) U.S. Cl. .................................. 73/514.15; 73/514.21

(58) Field of Search .......................... 73/514.15, 514.17, 73/514.18, 514.21, 514.23, 514.29, 514.36, 514.37

(56) References Cited

U.S. PATENT DOCUMENTS 4,699,006 A  * 10/1987  Boxenhorn .............. 73/514.15

* cited by examiner

Primary Examiner—John E. Chapman
(74) Attorney, Agent, or Firm—Mirick, O'Connell, DeMallie & Lougee, LLP

(57) ABSTRACT

A tuned flexure accelerometer, comprising, a housing; a gimbal coupled to the housing for oscillation about a gimbal oscillation axis; and a reference mass coupled by one or more pivots to the gimbal to allow pivoting motion of the reference mass relative to the gimbal about a pivot axis which is transverse to the gimbal oscillation axis, the one or more pivots having an effective elastic restraint. The gimbal is oscillated about its oscillation axis, to thereby induce on the one or more pivots an oscillating negative elastic restraint, to reduce the effective elastic restraint of the pivots.

9 Claims, 4 Drawing Sheets

PRIOR ART

TUNED FLEXURE ACCELEROMETER

FIELD OF THE INVENTION

This invention relates to an accelerometer, in which the elastic restraint of the reference mass is decreased or eliminated by means of oscillation, to improve the ability to accurately measure position with the accelerometer.

BACKGROUND OF THE INVENTION

A rigid body has six degrees of freedom: three are translational and three are rotational. In a practical accelerometer, mainly for purposes of ruggedness, it is desirable to rigidly constrain five of the six degrees of freedom and allow the reference mass only one degree of freedom. An unrestrained single degree of freedom reference mass could in principle directly sense displacements of the accelerometer housing with respect to the reference mass along a single axis. However, in all but the most benign applications the single degree of freedom is partially constrained by an elastic restraint combined with viscous damping. In the case of an elastically restrained degree of freedom, a bias in the read-out that senses the reference mass displacement with respect to the accelerometer housing contributes the principal error mechanism. This read-out bias causes instrument errors that are proportional to acceleration, resulting in displacement errors that grow quadratically with time. In the case of viscous damping, the errors due to a random bias in the read-out are proportional to velocity, and thus the displacement error grows linearly with time.

Dynamic tuning of accelerometers by means of a spinning, elastic, universal joint has been a part of the prior art for many years. This invention is applicable to instruments with non-spinning reference masses. A typical, prior art, single degree of freedom accelerometer with an elastically restrained, pendulous, reference mass consists of a reference mass, M, suspended on elastic pivot flexures, which hold the reference mass suspended inside a housing. An acceleration of the housing in the sensing direction causes the housing to move relative to the reference mass. This exerts a torque on the pendulous reference mass through the elastic flexure pivots and also through any viscous medium in the gaps between the stationary and moving members, causing the flexure pivots to bend. The resulting motion of the reference mass with respect to the housing is detected by suitable displacement sensors, and a force is applied to re-center the reference mass.

A problem addressed by this invention is that in the prior art soft flexures are needed to increase the sensitivity of the accelerometer, while stiff flexures are required to provide ruggedness and to constrain the unused five degrees of freedom. These conflicting requirements cannot both be satisfied, and this is a perennial limitation of flexure suspended reference masses. Other approaches to solve this problem are typically: (1) float the pendulous mass in a neutrally buoyant viscous fluid, which is expensive; (2) decrease the reference mass, however, this reduces sensitivity and signal-to-noise ratio; (3) build stronger torquers to give wider dynamic range, which requires more power and bulkier instruments; (4) build in smaller gaps to increase the damping, which makes the instrument more rugged and improves read-out bias stability, however the long term drift is still dominated by the torque derived from the spring stiffness; and (5) improve the read-out stability and reduce error torques by improvements in technology and careful design. These approaches have been brought to their limits over the last several decades.

SUMMARY OF THE INVENTION

In accelerometer design it is known that eliminating the elastic restraint from the single degree of freedom reference mass greatly improves the ability to measure position accurately. For this reason, this invention provides a means to partially or fully cancel the elastic restraint by a method of dynamic tuning based on oscillation of the gimbal that supports the reference mass.

For some analytical background describing the dynamics of an elastically restrained, damped mass, let the single degree of freedom of a reference mass, M, be restrained with respect to a housing structure by a spring constant, K, and a damping constant, D, as depicted in FIG. 1. Assuming the mass has a single translational degree of freedom, the equation of motion is shown in equation 1, where x is the acceleration of the reference mass with respect to inertial space and $\Delta x$ is the displacement of the reference mass from the spring null position. In a closed loop accelerometer, a force, F, is nominally derived from a control loop that drives $\Delta x$ to zero. The measured force gives an estimate of the acceleration, shown in equation 2. However, a read-out that senses $\Delta x$ is not perfect and $\Delta x$ is not zero. This results in an extraneous rebalance force $\Delta F = K \Delta x$, which translates into an acceleration error shown in equation 3. This is usually the dominant error in an accelerometer with an elastically restrained reference mass. It is this error that the tuning of this invention reduces or eliminates.

Furthermore, there is a low frequency resonance in this system that must be damped. Usually this system is highly damped and it is desirable to keep the time constant D/K as long as possible to damp out shock and vibration without destroying the sensitivity of the instrument. Dynamic tuning of this invention reduces or eliminates this resonance and provides an extremely long time constant.

The invention herein provides a dynamic tuning mechanism that replaces the mechanical spring constant, K, by a 'tuned' stiffness, $K - K_{tuned}$, so the acceleration error is now given by equation 4, and the low frequency time constant is given by equation 5. By properly tuning the effective stiffness so that $(K - K_{tuned})$ is zero, the acceleration error may be made to vanish and the time constant effectively goes to infinity, giving a velocity memory to the reference mass dynamics. These are properties that were only found in fluid filled instruments before this invention.

With a 'tuned' elastic restraint, the equation of motion at low frequencies is given by equation 6. The measured force still gives an estimate of the acceleration shown in equation 7. However, a read-out bias error, Dx, now contributes nothing to the acceleration error, but rather contributes a velocity error shown in equation 8 which in practice is much more benign than an acceleration error. In addition there are no low frequency resonances in this system, and the dynamic hang-off displacement is a measure of uncompensated velocity.

Dynamic tuning by oscillation, according to this invention, can solve all of the problems of the prior art. The reason is that the effective elastic restraint, $K - K_{tuned}$, of the dynamically tuned flexures restraining the sensitive degree of freedom can be made several orders of magnitude smaller than the mechanical stiffness, K. Therefore, a tuned flexure accelerometer of this invention can have both rugged flexures and high dynamic range simultaneously. This solves the perennial accelerometer design problem.

This invention features in one embodiment a tuned flexure accelerometer, comprising: a housing; a gimbal coupled to the housing for oscillation about a gimbal oscillation axis; a reference mass coupled by one or more pivots to the gimbal to allow pivoting motion of the reference mass relative to the gimbal about a pivot axis which is transverse to the gimbal oscillation axis, the one or more pivots having an effective elastic restraint; and means for inducing on the one or more pivots an oscillating negative elastic restraint, to reduce the effective elastic restraint of the pivots.

The means for inducing may include means for oscillating the reference mass about an inducing oscillation axis which is transverse to the pivot axis. The means for oscillating the reference mass may include means for oscillating the gimbal about the gimbal oscillation axis. The means for oscillating the reference mass may further include means for varying one of the gimbal oscillation amplitude and the gimbal oscillation frequency and the gimbal oscillation inertia. The means for oscillating the reference mass preferably includes means for varying the gimbal oscillation amplitude.

The means for oscillating the gimbal about the gimbal oscillation axis preferably oscillates the gimbal to create a negative elastic restraint which substantially fully cancels the effective elastic restraint of the one or more pivots.

The reference mass may be coupled to the gimbal by a pair of flexures. The gimbal oscillation axis may be nominally orthogonal to the pivot axis. The reference mass may be carried within the gimbal. The gimbal may comprise a generally planar structure. The reference mass may comprise a generally planar structure which is nominally coplanar with the gimbal.

The reference mass may have a null position with respect to the housing, in which case the invention may further include means for sensing the pivoting motion of the reference mass from the null position. The accelerometer may further include means, responsive to the means for sensing, for driving the reference mass closer to its null position.

In another embodiment, this invention features a tuned flexure accelerometer, comprising: a housing; a gimbal coupled to the housing for oscillation about a gimbal oscillation axis; a reference mass coupled by one or more pivots to the gimbal to allow pivoting motion of the reference mass relative to the gimbal about a pivot axis which is nominally orthogonal to the gimbal oscillation axis, the one or more pivots having an effective elastic restraint; and means for oscillating the gimbal about the gimbal oscillation axis to thereby induce on the one or more pivots an oscillating negative elastic restraint, to reduce the effective elastic restraint of the pivots.

BRIEF DESCRIPTION OF THE DRAWINGS

Other objects, features and advantages will occur to those skilled in the art from the following description of the preferred embodiments, and the accompanying drawings, in which.

DESCRIPTION OF THE PREFERRED EMBODIMENTS

This invention may be accomplished in a tuned flexure accelerometer, comprising: a housing; a gimbal coupled to the housing for oscillation about a gimbal oscillation axis; a reference mass coupled by one or more pivots to the gimbal to allow pivoting motion of the reference mass relative to the gimbal about a pivot axis which is transverse to the gimbal oscillation axis, the one or more pivots having an effective elastic restraint; and means for inducing on the one or more pivots an oscillating negative elastic restraint, to reduce the effective elastic restraint of the pivots.

Figure 1:
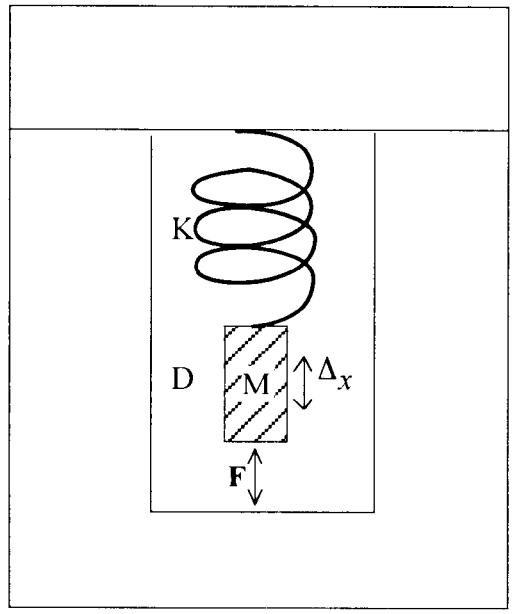
FIG. 1 is a schematic diagram illustrating the motion of a reference mass under acceleration, useful in understanding this invention.
Figure 2:
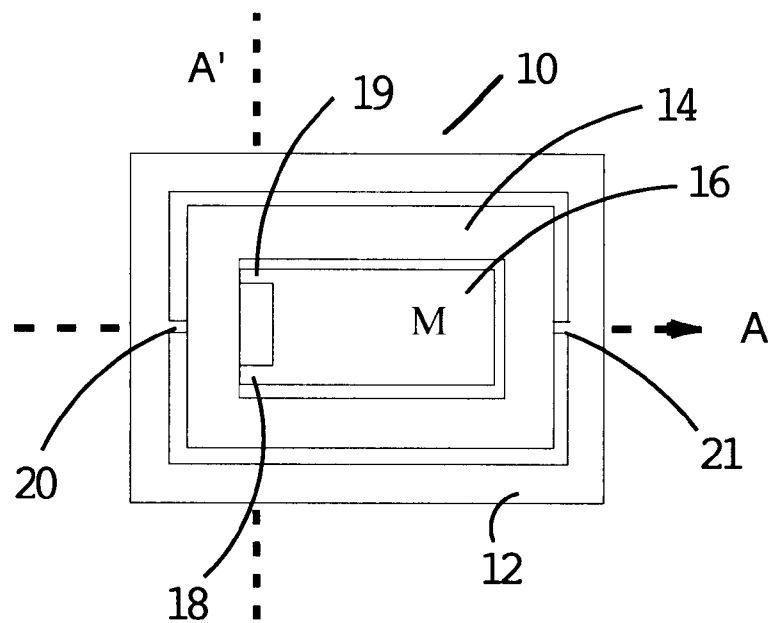
FIG. 2 is a schematic diagram of an accelerometer of this invention.

A plane view sketch of a tuned accelerometer 10 of this invention is depicted in FIG. 2. Compare this to FIG. 1. The inner element 16 is a pendulous mass suspended on flexure pivots 18 and 19. The middle gimbal 14 is an inner housing that supports the reference mass and is pivoted on elastic flexures 20, 21. The middle gimbal pivot axis A is orthogonal to the reference mass pivot axis A'. The outer structure 12 is a housing fixed relative to the vehicle or other device carrying the accelerometer. The oscillation axis that induces dynamic tuning is depicted by the heavy arrow A. An oscillating negative elastic restraint is induced on the flexures 18, 19, supporting the reference mass 16 when the middle gimbal 14 is oscillated about axis A.

Figure 3:
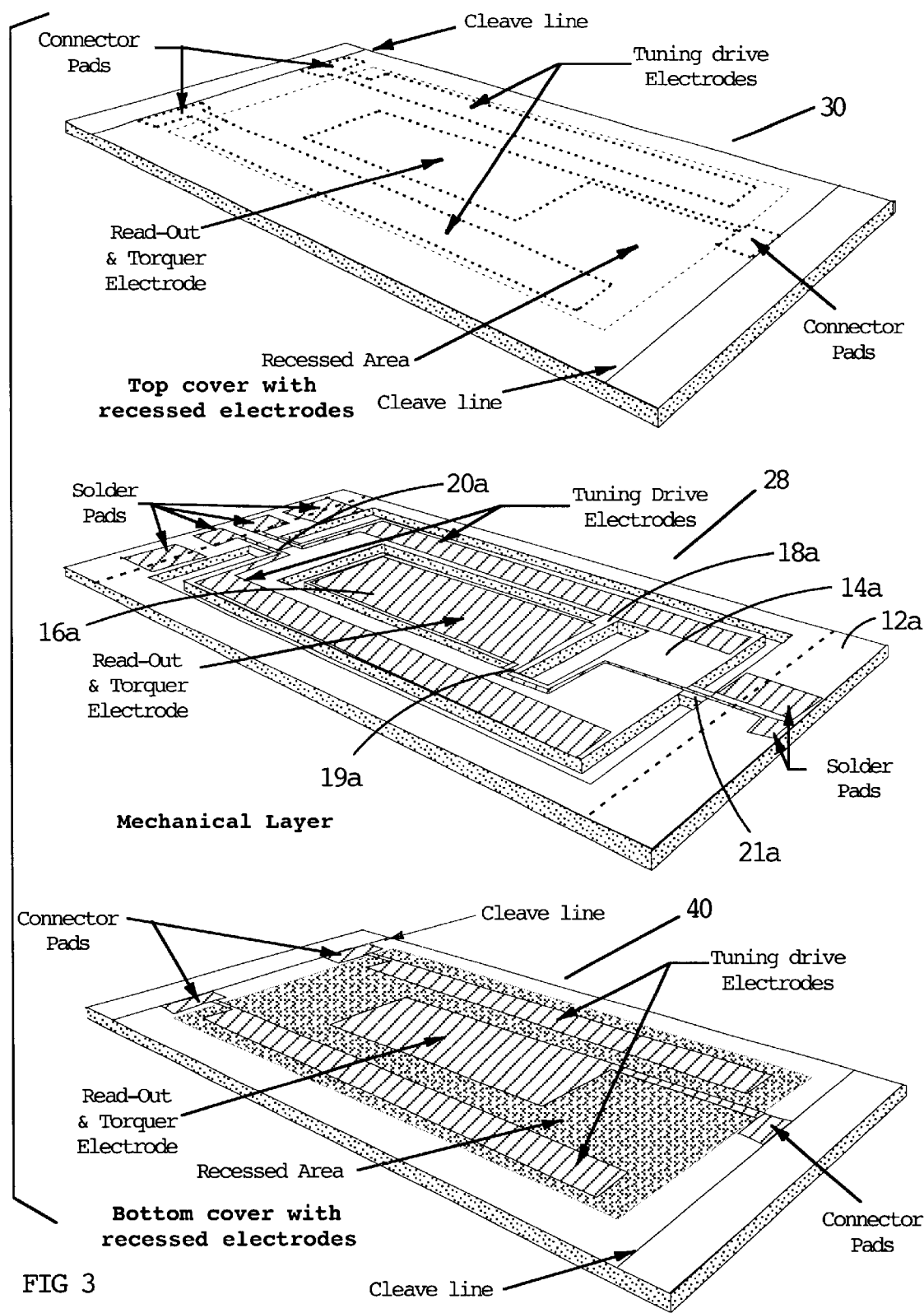
FIG. 3 is an exploded, schematic view of a planar accelerometer of this invention, showing the sense and drive means.

A more detailed view of a planar accelerometer 10a of this invention is shown in FIG. 3, which is a more detailed perspective view of FIG. 2 with a reference mass 16a, an oscillating gimbal 14a, and a housing 12a shown. In this illustration the read-out electrodes are mounted on the reference mass, which is torsionally pivoted by pivots 18a, 19a, on the oscillating gimbal. The pendulosity of this mass causes it to tilt away from the torsional flexure null when an acceleration is applied perpendicular to the plane of the device. The read-out senses this tilting of the reference mass with respect to the housing. The read-out electrodes may also be used (with appropriate feedback control, not shown) to torque the pendulum back to null. The electrodes labeled "tuning drive electrodes" are used to oscillate the oscillating gimbal about elastic flexures 20a, 21a. This oscillation provides the negative elastic restraint that is used to tune the reference mass torsional flexures 18a, 19a. These electrodes may also be used as a read-out if desired. There is a symmetric set of electrodes on the back side of the mechanical layer 28. Facing each of the mechanical layer electrodes is a matching electrode on the facing housing covers 30 and 40. These matching electrodes form a capacitor that is used for forcing or sensing or both. The cover electrodes and the area on the cover adjacent to the moving gimbal and reference mass are recessed to allow for gaps. These gaps partially determine the damping constants and the capacitances. The covers have connecting electrodes that are not recessed. These are in direct contact with pads on the mechanical layer and are used to transfer current directly from the soldering pads mounted on the mechanical layer to the covers. The covers are cleaved on the cleave lines to expose the mechanical layer soldering pads.

Figure 4:
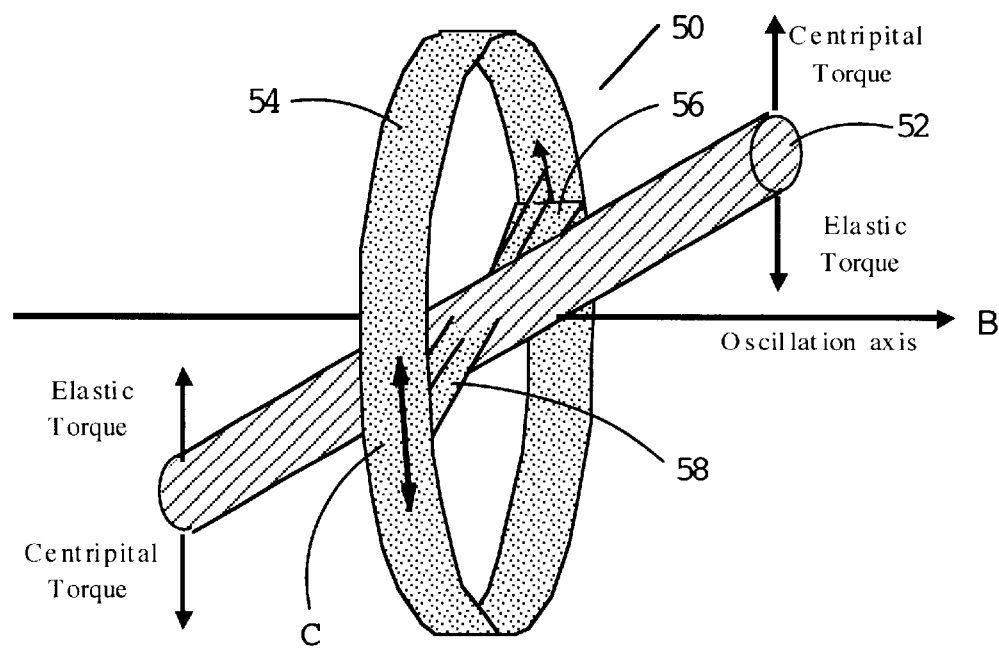
FIG. 4 is a schematic diagram of another accelerometer of this invention, illustrating the generation of, and effect of, the negative elastic restraint.

FIG. 4 schematically illustrates a means for generating a negative, oscillating elastic restraint using a sketch of a balanced beam 52 supported by elastic torsional pivots 56, 58 on an oscillating gimbal structure 54. When the gimbal 54 is oscillated that oscillation is transmitted to the beam, which also oscillates about the same oscillation axis B.

In FIG. 4, the balanced beam 52 is shown tilted away from the torsional pivot flexure null position, in which it is aligned with axis B. The elastic flexure exerts a restoring moment as shown and labeled "Elastic Torque". The oscillating structure supporting the balanced beam is represented by the hoop-shaped gimbal structure supporting the torsional flexure pivots. The oscillation axis is horizontal and aligned with the balanced beam axis when it is centered. The oscillation axis is nominally orthogonal to the balanced beam pivot axis, not shown, but along the longitudinal axes of pivots 56, 58. The curved arrow C gives a sense of the oscillatory motion of the supporting gimbal structure 54.

When the balanced beam is tilted away from the oscillation axis, as shown in FIG. 4, the forced oscillation induces centripetal forces on the beam, which generates a torque moment that acts on the beam in opposition to the flexure torque. The beam, oscillating with the gimbal structure, develops the centripetal torque only when the beam is tilted and the centripetal torque is proportional to the tilt angle. Therefore it is a negative elastic restraint.

Figure 5:
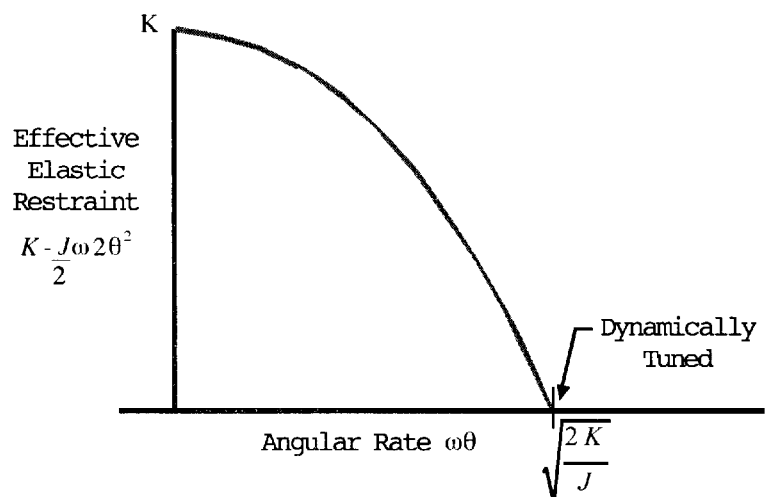
FIG. 5 is a graph of the angular rate versus the effective elastic restraint, for the accelerometer of FIG. 4.

The centripetal torque is equal to the product of (1) the quadrapole moment along the oscillation axis of the beam as shown in equation 9, (2) the angular velocity of the oscillating gimbal squared as shown in equation 10, and (3) the tilt angle, $\phi$, of the beam away from the oscillation axis. This torque is therefore represented as a negative, oscillating torsional elastic restraint modulated at twice the gimbal oscillation frequency, as in equation 11. The dependence of the combined mechanical flexure elastic restraint, K, and the average negative centripetal elastic restraint shown in equation 12, is depicted in FIG. 5, where the gimbal oscillation is represented by the angle, $\Theta \sin \omega t$. Note that the $\sin^2 \omega t$ factor has an average value of ½, and that tuning occurs when the average centripetal elastic restraint is equal to the mechanical torsional stiffness, K. It is clear from FIG. 5 that there are three options for tuning adjustment: (1) Amplitude tuning, (2) Frequency tuning, and (3) Inertia Tuning. Amplitude tuning is the most convenient method, because it is relatively easy to adjust the oscillation amplitude electronically, while frequency tuning generally involves changing a systems clock period and inertia tuning requires an adjustment of the physical dimensions of the gimbal, although the others can be effective.

Figure 6:
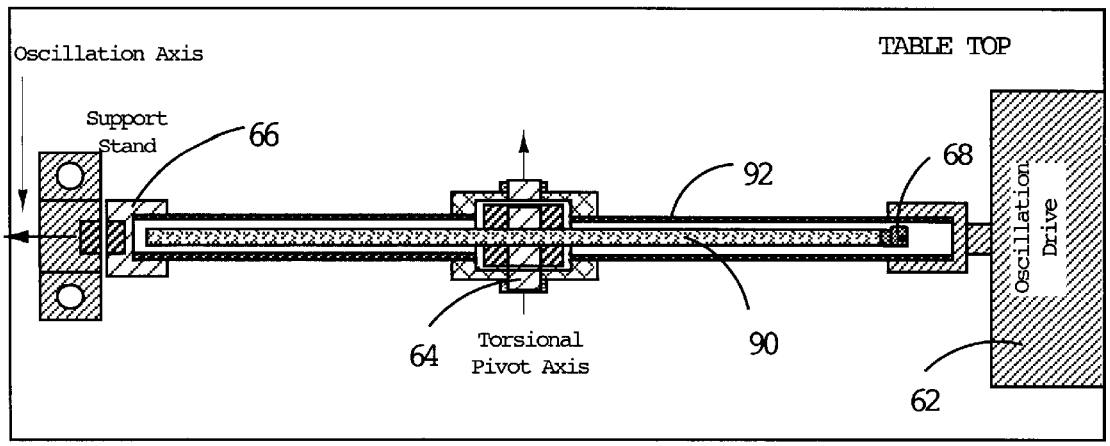
FIG. 6 is a schematic diagram of a flexure tuning device illustrating the invention.

A sketch of a flexure tuning device illustrating this invention is shown in FIG. 6. A commercial mirror drive 62 oscillates the gimbal, which is in the shape of a narrow hollow tube 92 to keep down the moment of inertia about the drive axis. An accelerometer need not be pencil shaped.

The hardware consists of an inner slightly unbalanced beam 90 in the shape of a rod. The rod is suspended at its center of mass on a Lucas™ flexure pivot 64 supported by the outer gimbal 92. The outer gimbal 92 is driven to oscillate about the cylinder axis. The supporting outer gimbal member is a thin hollow tube driven on one end by the mirror oscillator and supported at the other end by a stand 66. A screw 68 is attached to the tuning rod to unbalance the rod.

Figure 7:
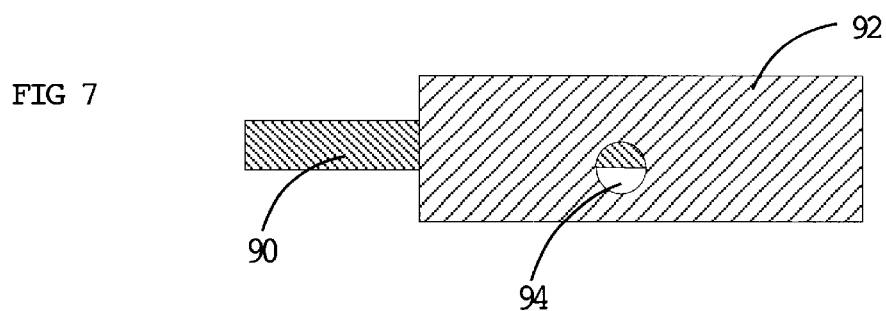
FIG. 7 is a close-up view of the read-out of the device of FIG. 6.

The read-out of the test device shown in FIG. 6 is shown in FIG. 7. and consists of a hole 94 drilled into the outer tube 92, illuminated by a light source, not shown. There is a hole at each end of the outer tube. The angular tilt of the inner rod 90 modulates the light intensity transmitted through the hole. Therefore the intensity transmitted through the partially blocked hole is a measure of the beam angular tilt with respect to the oscillation axis.

In operation, the outer gimbal oscillation induces a negative elastic restraint by means of centrifugal forces acting on the extremities of the inner rod whenever the inner rod is tilted away from the oscillation axis. Under non-tuned condition the torsional pivot suspension is stiff and maintains the inner rod centered in the cylindrical sleeve with a natural frequency of about 2 Hz and a very high Q.

In the demonstration, as the tuning condition was approached, the natural frequency of the elastically restrained rod decreased as expected, since the elastic restraint is decreasing as in FIG. 5. When the tuning condition was met the natural frequency of the inner rod became unobservable because the inner rod, now with no elastic restraint, simply tilted about the pivot axis away from its null position, blocking off the readout aperture. By over tuning, i.e., increasing the mirror oscillation amplitude substantially above the tuned condition, the inner rod became unstable, because the elastic restraint became negative, causing the inner rod to bounce off the tubular housing. At the tuned condition the residual mass unbalance in the rod, although very small, caused the inner rod to rest against one of the walls as was expected from the absence of elastic restraint.

The natural frequency oscillations and the tilt of the unbalanced beam were observed using a laser, photo detector and oscilloscope, although they could be observed directly also.

Figure 8:
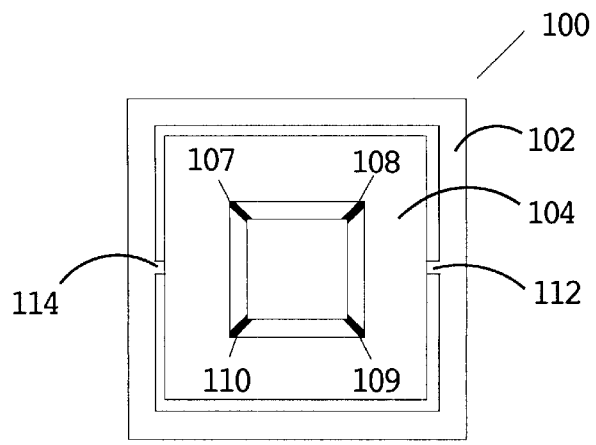
FIG. 8 is a view similar to that of FIG. 2, but for an accelerometer of this invention in which the reference mass is free to move out of the plane of the page.

The tuning of this invention may be applied to tune a configuration 100 where the reference mass is free to move out of the plane of the page—referring to the sketch in FIG. 8. Pendulous mass 106 is suspended from middle gimbal 104 by flexure pivots 107–110. Middle gimbal 104 pivots on elastic flexures 112 and 114 from housing 102. Furthermore, a reference mass with two degrees of freedom can also be vibrationally tuned by applying the vibration about the axis that is simultaneously orthogonal to both degrees of freedom. Other configurations may be made that apply to this invention.

The following are the equations referred to in the text above:

EQUATIONS

Equation 1:

$$M\ddot{x} + D \cdot \Delta\dot{x} + K \cdot \Delta x = F$$

Equation 2:

$$\ddot{x}_{sensed} = F/M$$

Equation 3:

$$\ddot{x}_{error} = K\Delta x/M$$

Equation 4:

$$\ddot{x}_{error} = (K - K_{tuned}) \cdot \Delta x/M$$

Equation 5:

$$\tau = D/(K - Kd_{tuned})$$

Equation 6:

$$M\ddot{x} + D \cdot \Delta x = \int F dt$$

Equation 7:
$$\ddot{x}_{sensed} = F/M$$

Equation 8:
$$\dot{x}_{error} = D\Delta x/M$$

Equation 9:
$$J = \int Z^2 dM$$

Equation 10:
$$(\omega\Theta\sin\omega t)^2$$

Equation 11:
$$K_{tuned}\phi = -J\omega^2\Theta^2 \sin^2 \omega t \cdot \phi.$$

Equation 12:
$$<K_{tuned}> = -J\omega^2\Theta^2/2$$

Although specific features of the invention are shown in some drawings and not others, this is for convenience only, as the features may be combined in accordance with the invention.

Other embodiments will occur to those skilled in the art and are within the following claims.

What is claimed is:

1. A tuned flexure accelerometer, comprising:
   a housing;
   a gimbal coupled to said housing for oscillation about a gimbal oscillation axis;
   a reference mass coupled by one or more pivots to said gimbal to allow pivoting motion of said reference mass relative to said gimbal about a pivot axis which is transverse to said gimbal oscillation axis, said one or more pivots having an effective elastic restraint; and
   means for inducing on said one or more pivots an oscillating negative elastic restraint, to reduce the effective elastic restraint of said pivots, said means for inducing including means for oscillating said reference mass about an inducing oscillation axis which is transverse to said pivot axis, said means for oscillating said reference mass including means for oscillating said gimbal about said gimbal oscillation axis to create a negative elastic restraint which substantially cancels said effective elastic restraint of said one or more pivots.

2. The tuned flexure accelerometer of claim 1, in which said means for oscillating said reference mass further includes means for varying one of the gimbal oscillation amplitude and the gimbal oscillation frequency and the gimbal oscillation inertia.

3. The tuned flexure accelerometer of claim 2, in which said means for oscillating said reference mass includes means for varying the gimbal oscillation amplitude.

4. The tuned flexure accelerometer of claim 1, in which said reference mass is coupled to said gimbal by a pair of flexures.

5. The tuned flexure accelerometer of claim 1, in which said gimbal oscillation axis is nominally orthogonal to said pivot axis.

6. The tuned flexure accelerometer of claim 1, in which said reference mass is carried within said gimbal.

7. The tuned flexure accelerometer of claim 6, in which said gimbal comprises a generally planar structure.

8. The tuned flexure accelerometer of claim 7, in which said reference mass comprises a generally planar structure which is nominally coplanar with said gimbal.

9. A tuned flexure accelerometer, comprising:
   a housing;
   a gimbal coupled to said housing for oscillation about a gimbal oscillation axis;
   a reference mass coupled by one or more pivots to said gimbal to allow pivoting motion of said reference mass relative to said gimbal about a pivot axis which is transverse to said gimbal oscillation axis, said one or more pivots having an effective elastic restraint, said reference mass having a null position with respect to said housing;
   means for sensing the pivoting motion of said reference mass from said null position;
   means for inducing on said one or more pivots an oscillating negative elastic restraint, to reduce the effective elastic restraint of said pivots; and
   means, responsive to said means for sensing, for driving said reference mass closer to its null position.

* * * * *